(12) United States Patent
Kang et al.

(10) Patent No.: US 11,509,403 B2
(45) Date of Patent: Nov. 22, 2022

(54) HUMAN BODY COMMUNICATION DEVICE AND OPERATING METHOD OF THE SAME

(71) Applicant: ELECTRONICS AND TELECOMMUNICATIONS RESEARCH INSTITUTE, Daejeon (KR)

(72) Inventors: Tae Wook Kang, Daejeon (KR); Sung Eun Kim, Daejeon (KR); Kwang Il Oh, Daejeon (KR); Hyuk Kim, Daejeon (KR); Mi Jeong Park, Sejong (KR); Hyung-Il Park, Daejeon (KR); Kyung Jin Byun, Daejeon (KR); Jae-Jin Lee, Daejeon (KR); In Gi Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 138 days.

(21) Appl. No.: 16/816,109

(22) Filed: Mar. 11, 2020

(65) Prior Publication Data
US 2020/0295848 A1   Sep. 17, 2020

(30) Foreign Application Priority Data

Mar. 14, 2019 (KR) .......................... 10-2019-0029546
Jul. 4, 2019 (KR) .......................... 10-2019-0080727

(51) Int. Cl.
*H04B 13/00* (2006.01)
*H04B 1/44* (2006.01)

(52) U.S. Cl.
CPC .............. *H04B 13/005* (2013.01); *H04B 1/44* (2013.01)

(58) Field of Classification Search
CPC ...... H04B 13/005; H04B 1/44; H04B 5/0081; H04B 5/0012; H04B 5/0093; H04W 4/80
See application file for complete search history.

(56) References Cited

U.S. PATENT DOCUMENTS 8,606,177 B2   12/2013   Hwang et al.
9,628,594 B2   4/2017    Rouaissia
(Continued)

FOREIGN PATENT DOCUMENTS

KR   1020080097608 A   11/2008
KR   1020170018233 A   2/2017
(Continued)

*Primary Examiner* — Lester G Kincaid
*Assistant Examiner* — Maryam Soltanzadeh

(57) ABSTRACT

Provided are a human body communication device and an operating method of the same. The human body communication device according to an embodiment of the inventive concept includes a first electrode, a second electrode, a transmitting circuit, a receiving circuit, a ground electrode, and a switch. The transmitting circuit generates a first signal in a transmitting mode and transmits the first signal to the first electrode. The receiving circuit receives a second signal from the first electrode in the receiving mode. The receiving circuit includes a differential amplifier that amplifies a difference between a voltage level of a first input terminal depending on the second signal and a voltage level of a second input terminal. The switch electrically connects the second electrode and the ground electrode in the transmitting mode, and electrically connects the second electrode and the second input terminal in the receiving mode.

20 Claims, 8 Drawing Sheets

(56) References Cited

U.S. PATENT DOCUMENTS

| | | | |
|---|---|---|---|
| 9,948,404 B2 | 4/2018 | Hyoung | |
| 10,044,449 B2 | 8/2018 | Oh et al. | |
| 2018/0323881 A1* | 11/2018 | Hashiguchi | H04B 13/005 |
| 2018/0351657 A1* | 12/2018 | Fukuda | H04B 13/005 |
| 2020/0169328 A1* | 5/2020 | Akiyama | H04B 13/005 |
| 2020/0195044 A1* | 6/2020 | Magno | H02J 50/001 |

FOREIGN PATENT DOCUMENTS

| | | |
|---|---|---|
| KR | 1020180005101 A | 1/2018 |
| KR | 1020180098498 A | 9/2018 |

* cited by examiner

HUMAN BODY COMMUNICATION DEVICE AND OPERATING METHOD OF THE SAME

CROSS-REFERENCE TO RELATED APPLICATIONS

This U.S. non-provisional patent application claims priority under 35 U.S.C. § 119 of Korean Patent Application Nos. 10-2019-0029546, filed on Mar. 14, 2019, and 10-2019-0080727, filed on Jul. 4, 2019, respectively, the entire contents of which are hereby incorporated by reference.

BACKGROUND

Embodiments of the inventive concept relate to a communication device, and more particularly, relate to a device for communicating using a human body as a medium and a method of operating the same.

A signal transfer medium is needed to exchange signals between electronic devices. A human body communication device that communicates using a human body as the medium may communicate between portable devices or between a fixed device and a portable device through a contact of a user. For example, a communication between portable devices such as a digital camera, a smart phone, a wearable device such as a smart watch, etc. and peripheral electronic devices may be performed through the contact by the user. In addition, a communication between devices attached to or inserted into the human body may be performed. The human body communication device may be applied in various fields such as a medical care, a security, a retail, a smart management, etc.

A human body communication of a capacitive coupling type exchanges a signal, based on an electrical potential difference between an electrical signal applied to the human body and the earth. The signal transmitted using the human body as a medium may be received from an electronic device that is connected to another part of the human body. In the human body communication of the capacitive coupling type, channel characteristics are determined based on a coupling capacitance value by the communication device itself, the user (human body), and an environment around the user. There is a demand for a human body communication device capable of improving a communication quality by securing a stability of such channel characteristics.

SUMMARY

Embodiments of the inventive concept provide a human body communication device and a method of operating the same that may increase an amplitude of a transmitted signal and may improve a signal-to-noise performance of a received signal to improve a communication quality.

A human body communication device according to an embodiment of the inventive concept includes a first electrode, a second electrode, a transmitting circuit, a receiving circuit, a ground electrode, and a switch. The first electrode transmits a first signal to an outside in a transmitting mode and receives a second signal from the outside in a receiving mode. The second electrode is spaced apart from the first electrode. The transmitting circuit generates the first signal in the transmitting mode and transmits the first signal to the first electrode. The receiving circuit receives the second signal from the first electrode in the receiving mode. The receiving circuit includes a differential amplifier for amplifying a difference between a voltage level of a first input terminal depending on the second signal and a voltage level of a second input terminal. The ground electrode is electrically connected to the transmitting circuit and the receiving circuit. The switch electrically connects the second electrode and the ground electrode in the transmitting mode and electrically connects the second electrode and the second input terminal in the receiving mode. The switch may disconnect the second electrode and the second input terminal in the transmitting mode and disconnect the second electrode and the ground electrode in the receiving mode.

In an embodiment, the human body communication device may further include a controller that determines the transmitting mode and the receiving mode, controls the transmitting circuit to transmit the first signal in the transmitting mode, and controls the receiving circuit to receive the second signal in the receiving mode. In an embodiment, the human body communication device may further include a controller that generates a first switch control signal in the transmitting mode and a second switch control signal in the receiving mode. The switch may electrically connect the second electrode and the ground electrode, based on the first switch control signal, and electrically connect the second electrode and the second input terminal, based on the second switch control signal.

In an embodiment, in the transmitting mode, a voltage level of the ground electrode may be equal to a voltage level of the second electrode. In an embodiment, in the receiving mode, a voltage level of the second electrode may be different from a voltage level of the ground electrode, and may be equal to the voltage level of the second input terminal. In an embodiment, the receiving circuit may further include a filter that filters the second signal, and the differential amplifier may receive the filtered second signal through the first input terminal.

In an embodiment, the first electrode and the second electrode may face to each other with respect to the ground electrode. A distance between the first electrode and the second electrode may be greater than a distance between the first electrode and the ground electrode. The first electrode may be in contact with a living body, and the second electrode may be spaced apart from the living body A human body communication device according to an embodiment of the inventive concept may include a first electrode, a second electrode that faces the first electrode, a communication circuit unit that is disposed between the first electrode and the second electrode. The communication circuit unit may include a transmitting circuit that transmits a first signal to the first electrode, a receiving circuit that receives a second signal from the first electrode and includes a differential amplifier for amplifying a difference between a voltage level of the second signal and a voltage level of the second electrode, and a ground electrode that provides a reference ground to the transmitting circuit and the receiving circuit, and is electrically connected to the second electrode when transmitting the first signal.

In an embodiment, the human body communication device may further include a case that is provided with an upper hole to which the second electrode is coupled and a lower hole to which the first electrode is coupled, and accommodates the communication circuit unit. In an embodiment, an area of the second electrode may be wider than an area of the first electrode. In an embodiment, a distance between the first electrode and the second electrode may be greater than a distance between the first electrode and the ground electrode.

In an embodiment, the communication circuit unit may further include a switch that electrically connects the second electrode and the ground electrode when the transmitting circuit transmits the first signal, and electrically connects the second electrode and the differential amplifier when the receiving circuit receives the second signal. The second signal may be provided to a first input terminal of the differential amplifier, and when the receiving circuit receives the second signal, the switch may electrically connect the second electrode and a second input terminal of the differential amplifier. In an embodiment, the communication circuit unit may further include a controller that generates a first switch control signal when the transmitting circuit transmits the first signal, and generates a second switch control signal when the receiving circuit receives the second signal. The switch may electrically connect the second electrode and the ground electrode, based on the first switch control signal, and electrically connect the second electrode and the differential amplifier, based on the second switch control signal.

A method of operating a human body communication device according to an embodiment of the inventive concept includes determining a transmitting mode for transmitting a signal to a first electrode or a receiving mode for receiving a signal from the first electrode, electrically connecting a second electrode spaced apart from the first electrode to a ground electrode in the transmitting mode, transmitting a first signal to the first electrode in the transmitting mode, receiving a second signal at a first input terminal of a differential amplifier through the first electrode in the receiving mode, and electrically connecting the second electrode to a second input terminal of the differential amplifier in the receiving mode.

In an embodiment, the method may further include generating a switch control signal when the transmitting mode is determined, and wherein the electrically connecting of the second electrode spaced apart from the first electrode to the ground electrode in the transmitting mode, may include disconnecting the second input terminal and the second electrode, based on the switch control signal, and connecting the second electrode and the ground electrode, based on the switch control signal.

In an embodiment, the method may further include generating a switch control signal when the receiving mode is determined, and wherein the electrically connecting of the second electrode to the second input terminal of the differential amplifier in the receiving mode, may include disconnecting the second electrode and the ground electrode, based on the switch control signal, and connecting the second input terminal and the second electrode, based on the switch control signal.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Embodiments of the inventive concept will be described below clearly and in detail such that those skilled in the art may easily practice the inventive concept.

Figure 1:
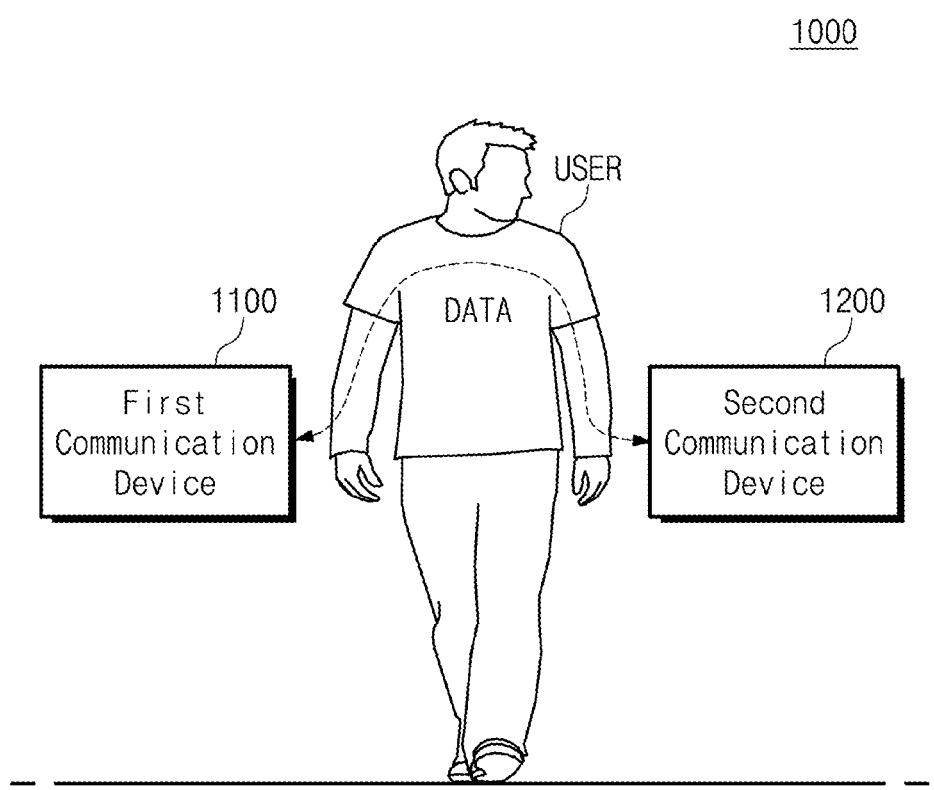
FIG. 1 is a diagram illustrating a human body communication system according to an embodiment of the inventive concept.

FIG. 1 is a diagram illustrating a human body communication system according to an embodiment of the inventive concept. Referring to FIG. 1, a human body communication system 1000 includes a first communication device 1100 and a second communication device 1200. The first communication device 1100 and the second communication device 1200 may exchange data DATA through a living body of a user USER. The human body communication system 1000 exchanges a signal and information (data DATA) using the living body of the user USER as a medium by using a capacitive coupling. However, a transfer medium of the data DATA is not limited to the human body such as the user USER, but may be applied to the living body such as a flora and fauna. For convenience of description, it is assumed that the transfer medium of the human body communication system 1000 is the user USER.

The first communication device 1100 and the second communication device 1200 may be a portable electronic device configured to be in contact with the user USER. For example, at least one of the first communication device 1100 and the second communication device 1200 may include various portable electronic devices such as a mobile terminal, a PDA, a smart card, etc. For example, at least one of the first communication device 1100 and the second communication device 1200 may be removable wearable devices such as a smart watch, glasses, a necklace, etc. However, the inventive concept is not limited thereto, and any one of the first communication device 1100 and the second communication device 1200 may be the portable electronic device, and the other may be a fixed electronic device that may contact the user USER. At least one of the first communication device 1100 and the second communication device 1200 may not only be attached to the human body but may also be inserted into the human body.

The first communication device 1100 and the second communication device 1200 may be a transceiver for transmitting or receiving the data DATA, using the user USER as the medium. The first communication device 1100 and the second communication device 1200 may be in contact with the user USER or may be spaced apart from a skin of the human body by a small interval to transmit or receive the data DATA. Since the data DATA is transferred using the human body as the medium, a binding force with regard to the signal is secured. A transmitting and receiving channel that uses the human body as the medium is formed based on a difference between a potential of an electrical signal provided by the first communication device 1100 or the second communication device 1200 and a potential formed around the human body.

A communication performance of the human body communication system 1000 depends on a coupling capacitance (hereinafter, referred to as a first capacitance) between ground (a ground electrode) that is included in the first communication device 1100 and the second communication device 1200 and earth ground, a coupling capacitance (hereinafter referred to as a second capacitance) between the ground electrode and the user USER, and a coupling capacitance (hereinafter referred to as a third capacitance) between the user USER and the earth ground. As a difference between a potential applied to the human body by the data DATA and a potential of the ground electrode increases, the transmitted data DATA have a higher voltage amplitude, and the communication performance of the human body communication system 1000 is improved. Therefore, as the first capacitance is large and the second and third capacitances are small, the communication performance of the human body communication system 1000 is improved. In addition, since the human body absorbs electrical noise generated around the human body relatively well, it is required to increase a signal-to-noise ratio of the received data DATA. Hereinafter, a structure and a circuit for improving communication performance of a human body communication device corresponding to the first communication device 1100 or the second communication device 1200 will be described.

Figure 2:
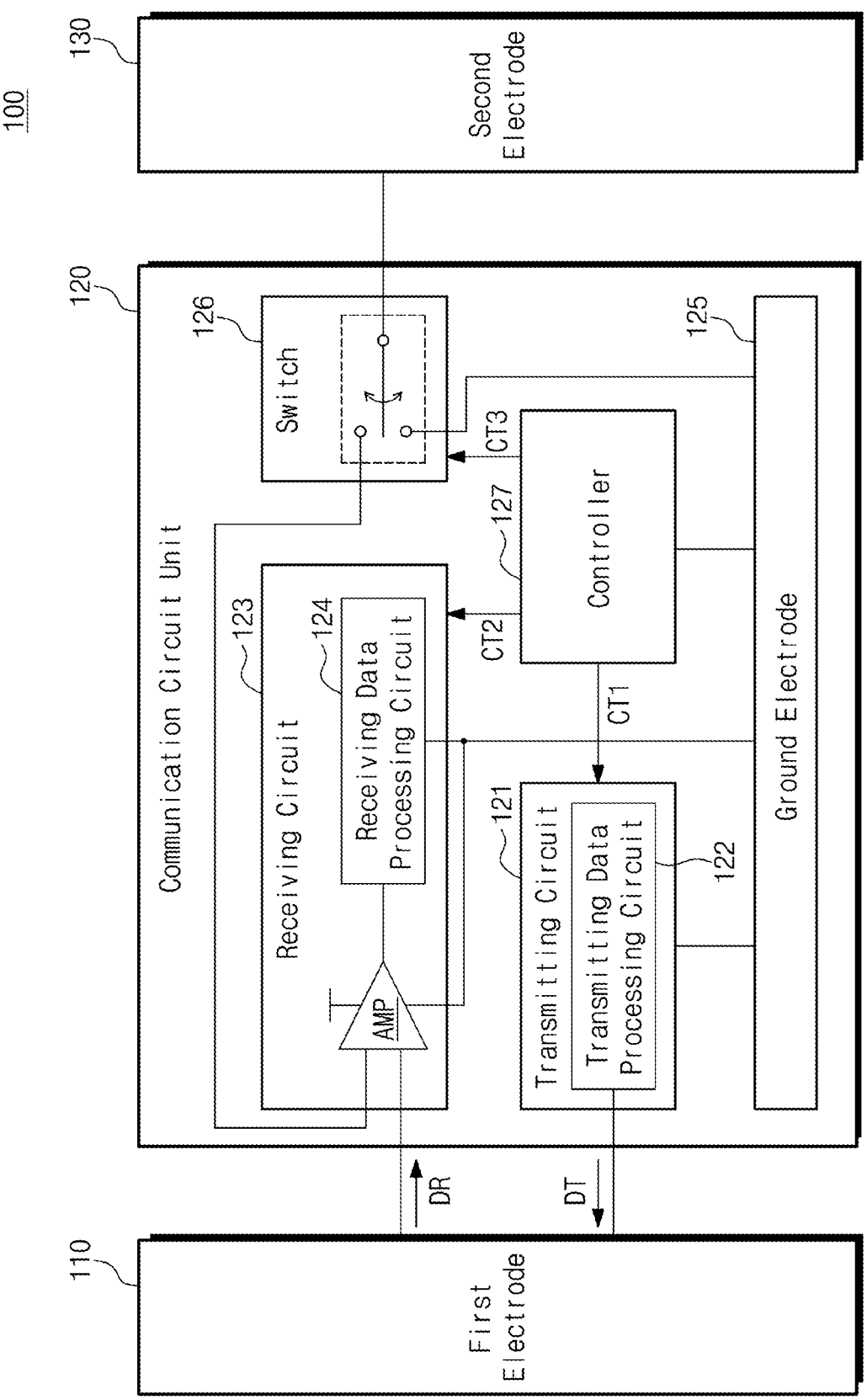
FIG. 2 is a block diagram illustrating a human body communication device according to an embodiment of the inventive concept.

FIG. 2 is a block diagram illustrating a human body communication device according to an embodiment of the inventive concept. A human body communication device 100 described with reference to FIG. 2 corresponds to the first communication device 1100 or the second communication device 1200 of FIG. 1. Referring to FIG. 2, the human body communication device 100 includes a first electrode 110, a communication circuit unit 120, and a second electrode 130. The human body communication device 100 may operate in a transmitting mode for transmitting a signal (hereinafter, referred to as a first signal DT) corresponding to the data DATA of FIG. 1, or may operate in a receiving mode for receiving a signal (hereinafter, referred to as a second signal DR) corresponding to the data DATA of FIG. 1.

The first electrode 110 is an electrode that transmits the first signal DT to the user USER of FIG. 1 or receives the second signal DR from the user USER. The first electrode 110 may be disposed in the communication device 100 to be in contact with the user USER or to be spaced apart by a set distance. The first electrode 110 may transmit the first signal DT generated from the communication circuit unit 120 to an outside in the transmitting mode. The first electrode 110 may transfer the second signal DR provided from the outside to the communication circuit unit 120 in the receiving mode.

The communication circuit unit 120 generates the first signal DT in the transmitting mode and then transmits the first signal DT to the first electrode 110, and receives the second signal DR through the first electrode 110 in the receiving mode. The communication circuit unit 120 will be understood as a concept including a hardware configuration that is implemented as an integrated circuit on a printed circuit board (PCB). The communication circuit unit 120 may include a transmitting circuit 121, a receiving circuit 123, a ground electrode 125, a switch 126, and a controller 127. However, the structure of the communication circuit unit 120 is not limited to the block diagram of FIG. 2. For example, the communication circuit unit 120 may further include various modules such as an interface circuit, a battery, a modem for further performing wireless communication, etc.

The transmitting circuit 121 may include a transmitting data processing circuit 122 for generating the first signal DT in the transmitting mode. For example, the transmitting data processing circuit 122 may generate the first signal DT, based on information received from an electronic device (not illustrated) external to the human body communication device 100. In an example, the transmitting data processing circuit 122 may generate the first signal DT by receiving information for generating the first signal DT from the controller 127, etc. Such information may be generated by the controller 127 itself in response to a request of an external electronic device (not illustrated) or may be generated based on sensed information of a sensor (e.g., an image sensor not illustrated) included in the human body communication device 100. The transmitting data processing circuit 122 may include an encoder for encoding corresponding information, a modulator for modulating the encoded information according to channel characteristics, an amplifier for amplifying the first signal DT, etc.

The transmitting circuit 121 or the transmitting data processing circuit 122 is electrically connected to the ground electrode 125. The first signal DT may be generated based on a potential difference formed between the transmitting data processing circuit 122 and the ground electrode 125. As the amplitude of the first signal DT increases, the transmission performance of the human body communication device 100 is improved. However, since a nature of the human body communication device 100 is required to be close to the human body, a distance between the ground electrode 125 and the human body is closer, and an electric field between the ground electrode 125 and the earth is relatively weakened, thereby reducing the coupling capacitance. In this case, the amplitude of the first signal DT decreases. The switch 126, which will be described later, electrically connects the second electrode 130 and the ground electrode 125 in the transmitting mode, thereby reducing a coupling between the ground electrode 125 and the human body and increasing a coupling between the ground electrode 125 and the earth ground. Therefore, the amplitude of the first signal DT may be increased by the switch 126.

The receiving circuit 123 may receive the second signal DR through the first electrode 110 in the receiving mode. To process the received second signal DR, the receiving circuit 123 may include a differential amplifier AMP and a receiving data processing circuit 124. Although not illustrated, the receiving circuit 123 may further include a filter, a comparator, etc. for removing noise, etc. before the differential amplifier AMP receives the second signal DR. The second signal DR may be changed by the filter, etc. before being input to the differential amplifier AMP, but will be consistently stated as the second signal DR unless essential information is changed.

A first input terminal of the differential amplifier AMP receives the second signal DR. In the receiving mode, a second input terminal of the differential amplifier AMP is electrically connected to the second electrode 130 by the switch 126 that will be described later. The differential amplifier AMP amplifies the potential difference between the first input terminal and the second input terminal. Since the nature of the human body communication device 100 is required to be close to the human body, the distance between the ground electrode 125 and the human body may become closer, and the electric field may be formed by the coupling capacitance between the ground electrode 125 and the human body. In this case, a reference ground that is provided by the ground electrode 125 to the differential amplifier AMP may become unstable, and stability of the second signal DR may decrease. Since a voltage level of the second input terminal of the differential amplifier AMP depends on a voltage level of the second electrode 130, an influence of the reference ground on an amplification operation decreases even though the reference ground is unstable. That is, since the second signal DR is amplified based on the voltage level of the second electrode 130 independent of the reference ground, the amplification operation of the differential amplifier AMP is not significantly affected by the reference ground.

The receiving data processing circuit 124 may restore the second signal DR to be the same as the signal when the amplified second signal DR is transmitted. For example, the receiving data processing circuit 124 may include a demodulator for demodulating the second signal DR that is modulated according to channel characteristics, a decoder for decoding the demodulated signal and correcting an error, etc. In addition, the receiving data processing circuit 124 may provide corresponding information to the controller 127 to manage the restored information.

The ground electrode 125 provides the reference ground for each of components of the communication circuit unit 120. To this end, the ground electrode 125 is electrically connected to the transmitting circuit 121, the receiving circuit 123, the switch 126, and the controller 127. Since the ground electrode 125 is spaced apart from the ground to each other without being directly connected to the ground, a voltage level of the ground electrode 125 and a voltage level of the earth ground may be different from each other. As described above, since the ground electrode 125 is disposed close to the human body, the coupling capacitor is formed between the human body and the ground electrode 125.

The switch 126 electrically connects the ground electrode 125 and the second electrode 130 in the transmitting mode. Accordingly, a coupling between the ground electrode 125 and the human body may be decreased, and a coupling between the ground electrode 125 and the earth ground may be increased. That is, an amplitude range of the first signal DT that is transmitted in the transmitting mode may increase.

The switch 126 electrically connects the second input terminal of the differential amplifier AMP and the second electrode 130 in the receiving mode. Accordingly, the second signal DR is amplified based on the voltage level of the second electrode 130 independent of the reference ground. Therefore, even though the reference ground provided by the ground electrode 125 is unstable by the coupling with the human body, the influence of the reference ground on the amplification operation may decrease.

The switch 126 may be a 2-to-1 switch that selectively connects the second electrode 130 to the ground electrode 125 or the differential amplifier (AMP). For example, when changing from the transmitting mode to the receiving mode, the switch 126 may disconnect the ground electrode 125 and the second electrode 130, and may connect the second input terminal of the differential amplifier AMP and the second electrode 130. For example, when changing from the receiving mode to the transmitting mode, the switch 126 may disconnect the second input terminal of the differential amplifier AMP and the second electrode 130, and may connect the ground electrode 125 and the second electrode 130.

The controller 127 may determine the transmitting mode and the receiving mode of the human body communication device 100. When the human body communication device 100 operates in the transmitting mode for transmitting the first signal DT, the controller 127 may generate a transmitting mode signal CT1 to activate the transmitting circuit 121. The transmitting circuit 121 may generate the first signal DT, based on the transmitting mode signal CT1, and transmit the first signal DT to the first electrode 110. When the human body communication device 100 operates in the receiving mode for receiving the second signal DR, the controller 127 may generate a receiving mode signal CT2 to activate the receiving circuit 123. The receiving circuit 123 may receive the second signal DR, based on the receiving mode signal CT2, and may amplify and restore the second signal DR.

The controller 127 may control the switch 126 such that the ground electrode 125 and the second electrode 130 are electrically connected to each other in the transmitting mode. The controller 127 may control the switch 126 such that the second electrode 130 and the second input terminal of the differential amplifier AMP are electrically connected to each other in the receiving mode. To this end, the controller 127 may generate a switch control signal CT3. The switch 126 may connect the ground electrode 125 and the second electrode 130, based on the switch control signal CT3 (first switch control signal) corresponding to the transmitting mode. The switch 126 may connect the second electrode 130 and the second input terminal of the differential amplifier AMP, based on the switch control signal CT3 (second switch control signal) corresponding to the receiving mode.

The second electrode 130 is disposed to be far from the human body in the human body communication device 100. For example, the second electrode 130 may face the first electrode 110 that is in contact with the human body with respect to the communication circuit unit 120. The second electrode 130 may be provided on an outer surface of the human body communication device 100. A coupling capacitance formed between the second electrode 130 and the human body may be less than a coupling capacitance formed between the ground electrode 125 and the human body. The human body communication device 100 may improve communication characteristics by using the second electrode 130.

The second electrode 130 may be provided to have a large area as much as possible. For example, the second electrode 130 may have a larger area than the first electrode 110 and the ground electrode 125. In this case, a coupling capacitance formed between the earth and the second electrode 130 may increase. The human body communication device 100 may improve the communication characteristics by using the second electrode 130.

The second electrode 130 is connected to the ground electrode 125 in the transmitting mode. That is, the first signal DT may be generated using a ground voltage close to the earth ground. Therefore, the amplitude range of the first signal DT increases, and the transmitting characteristic of the human body communication device 100 is improved. In addition, the second electrode 130 is connected to the input terminal of the differential amplifier AMP in the receiving mode. The second electrode 130 may have a weaker coupling with the human body and a stronger coupling with the ground than the ground electrode 125. Since the second signal DR is amplified based on the voltage level of the second electrode 130, a stable amplification operation may be performed and the signal-to-noise ratio of the second signal DR may be improved.

Figure 3:
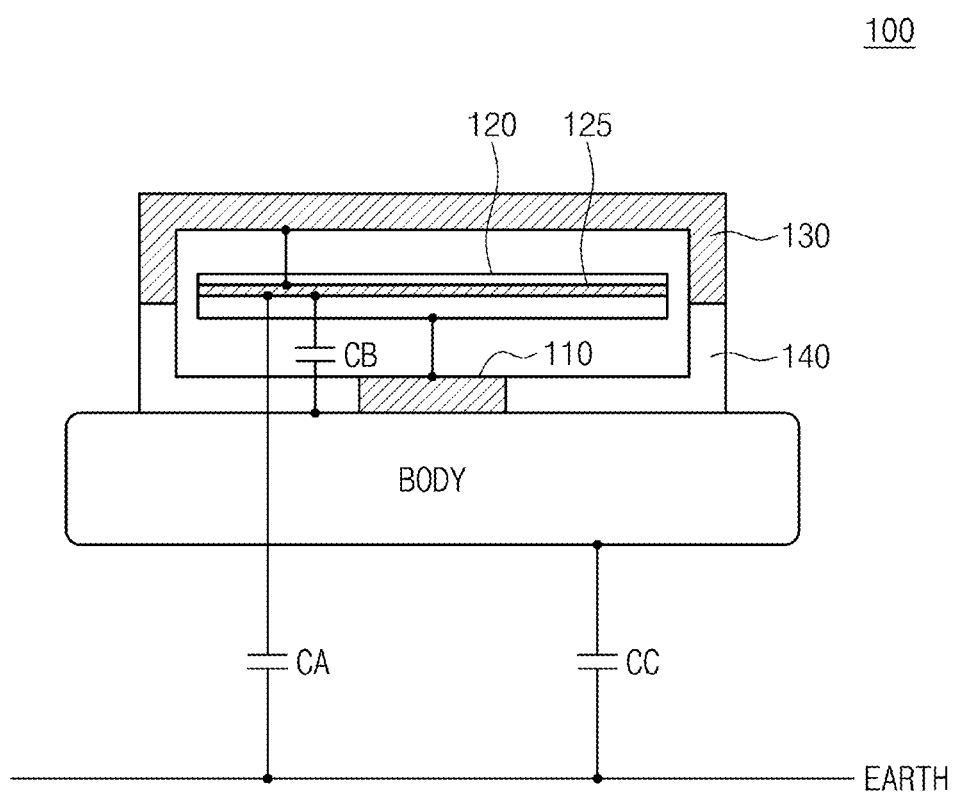
FIG. 3 is a diagram illustrating an exemplary cross-sectional view of a human body communication device of FIG. 2.

FIG. 3 is a diagram illustrating an exemplary cross-sectional view of a human body communication device of FIG. 2. Referring to FIG. 3, the human body communication device 100 may include the first electrode 110, the communication circuit unit 120, the second electrode 130, and a case 140. The first electrode 110, the communication circuit unit 120, and the second electrode 130 correspond to the first electrode 110, the communication circuit unit 120, and the second electrode 130 of FIG. 2. A shape of FIG. 3 is exemplary, and the shape of the human body communication device 100 is not limited to FIG. 3. For convenience of description, FIG. 3 will be described with reference to reference numerals of FIG. 2.

The first electrode 110 is configured to transmit the signal to the human body BODY or to receive the signal from the human body BODY. The first electrode 110 may be configured to be in contact with the human body BODY or spaced apart from the human body by the set distance. For example, the first electrode 110 may be provided on a portion of the outer surface of the human body communication device 100, which is provided by the case 140. The first electrode 110 may be electrically connected to the communication circuit unit 120 to transmit the signal to or receive the signal from the communication circuit unit 120.

The communication circuit unit 120 may be accommodated inside the case 140. The communication circuit unit 120 may be implemented as a circuit board in which the transmitting circuit 121, the receiving circuit 123, the switch 126, and the controller 127 of FIG. 1 are integrated. The communication circuit unit 120 may be disposed between the first electrode 110 and the second electrode 130. The communication circuit unit 120 is electrically connected to the first electrode 110 and the second electrode 130.

The communication circuit unit 120 includes the ground electrode 125. The ground electrode 125 provides the reference ground to the transmitting circuit 121, the receiving circuit 123, the switch 126, the controller 127, etc. that are included in the communication circuit unit 120. The ground electrode 125 may perform a function of discharging charges formed on the circuit board. The ground electrode 125 may be formed over an entire surface of the circuit board. As described above, the first capacitance CA may be formed between the ground electrode 125 and the earth ground (the earth). The second capacitance CB may be formed between the ground electrode 125 and the human body BODY. The third capacitance CC may be formed between the human body BODY and the earth ground. As the first capacitance CA becomes larger and the second and third capacitances CB and CC become smaller, the communication performance of the human body communication system 100 is further improved.

A capacitance is proportional to an overlap area between plates and inversely proportional to a distance between the plates. Therefore, when the area of the ground electrode 125 is increased or the distance between the ground electrode 125 and the earth ground is decreased, the first capacitance CA may increase. However, when the human body communication device 100 is the portable electronic device attached to the user, the area of the ground electrode 125 is limited, and the distance between the ground electrode 125 and the earth ground is hardly constrained. To solve this problem, the human body communication device 100 may include the second electrode 130.

The second electrode 130 may be disposed in the human body communication device 100 to be far from the human body BODY. To this end, the second electrode 130 may be provided on a portion of the outer surface of the human body communication device 100, which is provided by the case 140. The distance between the second electrode 130 and the first electrode 110 may be greater than the distance between the ground electrode 125 and the first electrode 110. As a result, the coupling capacitance between the second electrode 130 and the earth ground may be greater than the first capacitance CA, and the coupling capacitance between the second electrode 130 and the human body BODY may be less than the second capacitance CB.

The second electrode 130 may be provided in the human body communication device 100 to have a large area as much as possible. To this end, the second electrode 130 may be disposed on the case 140 and cover an upper surface of the human body communication device 100. The area of the second electrode 130 may be greater than the area of the first electrode 110 and the area of the ground electrode 125. As a result, the coupling capacitance between the second electrode 130 and the earth ground may be greater than the first capacitance CA.

In the transmitting mode, the second electrode 130 is electrically connected to the ground electrode 125. That is, the reference ground may be determined by the voltage level of the second electrode 130. By the second electrode 130, the first capacitance CA may increase, and the reference ground may be close to the voltage level of the earth ground. As a result, the amplitude range of the signal transmitted to the human body BODY may increase, and the transmission characteristic may be improved.

In the receiving mode, the second electrode 130 is electrically connected to the input terminal of the differential amplifier AMP (refer to FIG. 2) included in the communication circuit unit 120. That is, the signal received from the human body BODY may be amplified based on the voltage level of the second electrode 130. The coupling capacitance between the second electrode 130 and earth ground may be greater than the first capacitance CA, and the coupling capacitance between the second electrode 130 and the human body BODY may be less than the second capacitance CB. Thus, a stable amplification operation of the received signal is possible, and the signal-to-noise ratio of the received signal may be improved.

The case 140 may provide an internal space for accommodating the communication circuit unit 120. The lower hole in which the first electrode 110 is disposed may be provided in the case 140, and the upper hole in which the second electrode 130 is disposed may be provided. The case 140 may spatially separate the first electrode 110 and the second electrode 130 from each other. For example, the first electrode 110, the case 140, and the second electrode 130 may form the outer surface of the human body communication device 100.

Figure 4:
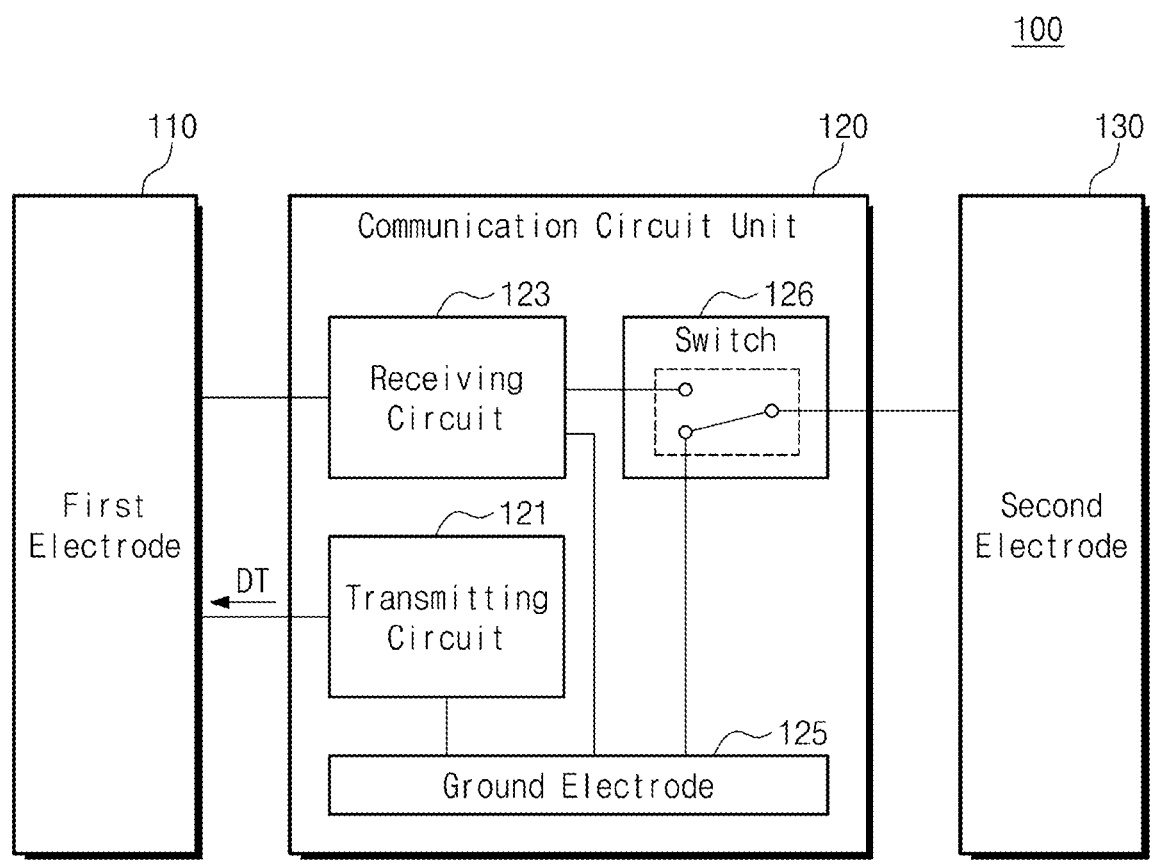
FIG. 4 is a block diagram describing an operation of a transmitting mode of the human body communication device of FIG. 2.

FIG. 4 is a block diagram describing an operation of a transmitting mode of the human body communication device of FIG. 2. Referring to FIG. 4, the human body communication device 100 includes the first electrode 110, the communication circuit unit 120, and the second electrode 130. The first electrode 110, the communication circuit unit 120, and the second electrode 130 correspond to the first electrode 110, the communication circuit unit 120, and the second electrode 130 of FIG. 2, respectively. The communication circuit unit 120 may include the transmitting circuit 121, the receiving circuit 123, the ground electrode 125, and the switch 126. For convenience of description, the controller 127 of FIG. 2 is omitted in FIG. 4.

In the transmitting mode, the switch 126 electrically connects the ground electrode 125 and the second electrode 130 to each other. The second electrode 130 and the receiving circuit 123 may not be electrically connected to each other through the switch 126. Accordingly, the voltage level of the second electrode 130 may be substantially the same as the voltage level of the ground electrode 125. The transmitting circuit 121 may use the voltage level of the second electrode 130 as the reference ground. As a result, the reference ground may be close to the voltage level of the earth ground, and the amplitude range of the first signal DT may increase.

Figure 5:
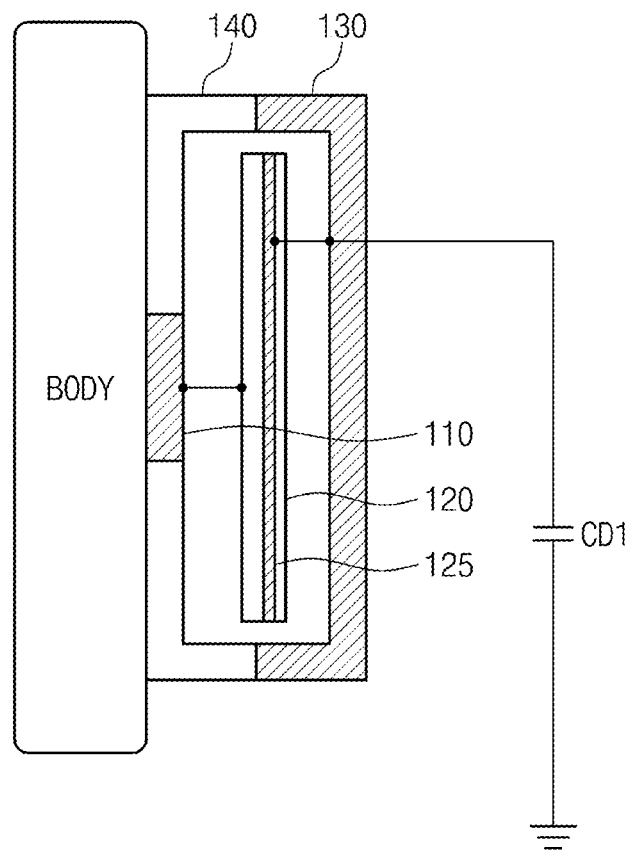
FIG. 5 is a diagram illustrating an exemplary cross-sectional view of a human body communication device of FIG. 4.

FIG. 5 is a diagram illustrating an exemplary cross-sectional view of a human body communication device of FIG. 4. Referring to FIG. 5, the human body communication device 100 includes the first electrode 110, the communication circuit unit 120, the second electrode 130, and the case 140. The first electrode 110, the communication circuit unit 120, the second electrode 130, and the case 140 correspond to the first electrode 110, the communication circuit unit 120, the second electrode 130, and the case 140 of FIG. 3, respectively. The communication circuit unit 120 includes the ground electrode 125. In the transmitting mode, the ground electrode 125 is electrically connected to the second electrode 130.

In the transmitting mode, a coupling capacitance CD1 is formed between the second electrode 130 and earth ground (the earth). The coupling capacitance CD1 may be greater than the first capacitance CA between the earth ground and the ground electrode 125 of FIG. 3. As a result, the reference ground of the ground electrode 125 may be closer to the voltage level of the earth ground, and the amplitude range of the transmitted signal may increase.

Figure 6:
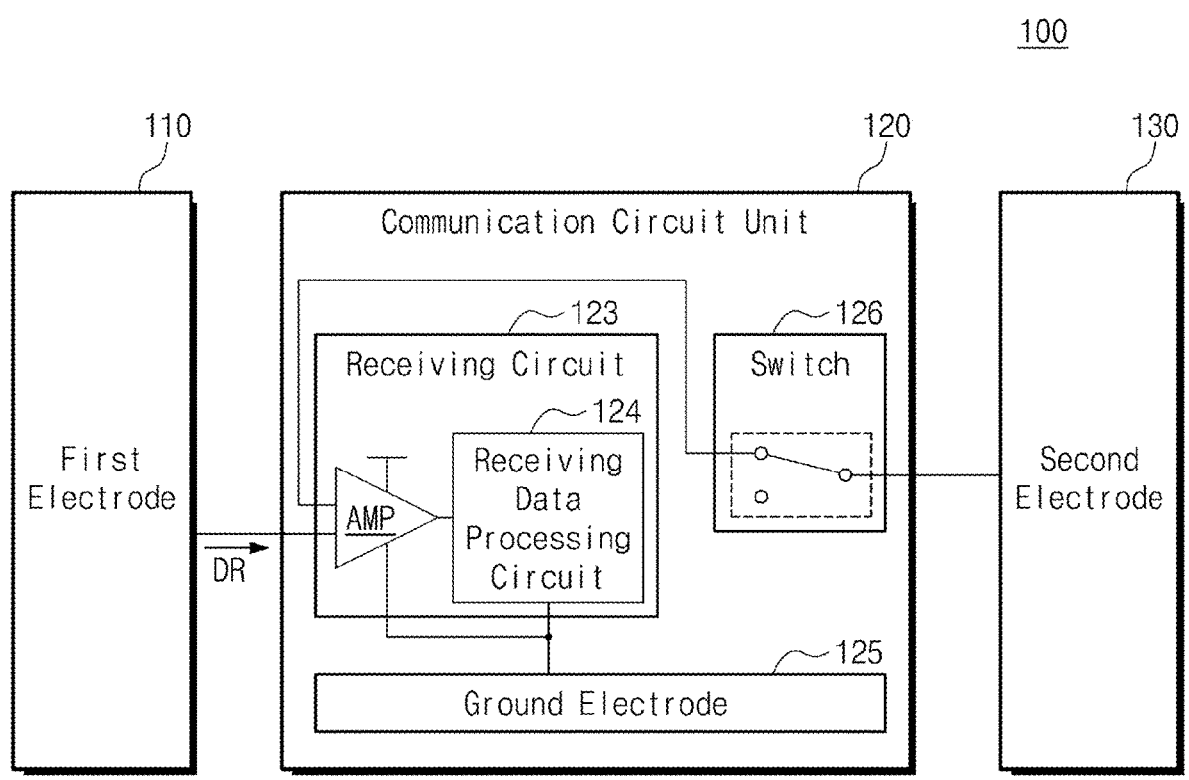
FIG. 6 is a block diagram describing an operation of a receiving mode of a human body communication device of FIG. 2.

FIG. 6 is a block diagram describing an operation of a receiving mode of a human body communication device of FIG. 2. Referring to FIG. 6, the human body communication device 100 includes the first electrode 110, the communication circuit unit 120, and the second electrode 130. The first electrode 110, the communication circuit unit 120, and the second electrode 130 correspond to the first electrode 110, the communication circuit unit 120, and the second electrode 130 of FIG. 2, respectively. The communication circuit unit 120 may include the receiving circuit 123, the ground electrode 125, and the switch 126. The receiving circuit 123 may include the differential amplifier AMP and the receiving data processing circuit 124. For convenience of description, the transmitting circuit 121 and the controller 127 of FIG. 2 are omitted in FIG. 6.

The receiving mode, that is, when the second signal DR is received through the first electrode 110 to the first input terminal of the differential amplifier AMP, the switch 126 electrically connects the second input terminal of the differential amplifier AMP and the second electrode 130 to each other. The ground electrode 125 and the second electrode 130 may not be directly and electrically connected to each other through the switch 126. Therefore, the voltage level of the second electrode 130 may be different from the voltage level of the ground electrode 125. In addition, the voltage level of the second electrode 130 may be closer to the voltage level of the earth ground than the voltage level of the ground electrode 125. Since the second electrode 130 is farther from the human body BODY than the ground electrode 125, the noise induced to the second electrode 130 may be less than the noise induced to the ground electrode 125. Here, the noise may be understood as noise generated in the human body BODY by way of example. As a result, even though the voltage level of the ground electrode 125 is unstable due to coupling with the human body, noise, etc., a stable amplification operation of the second signal DR may be performed. Thus, the stable amplification operation of the received signal is possible, and the signal-to-noise ratio of the received signal may be improved.

Figure 7:
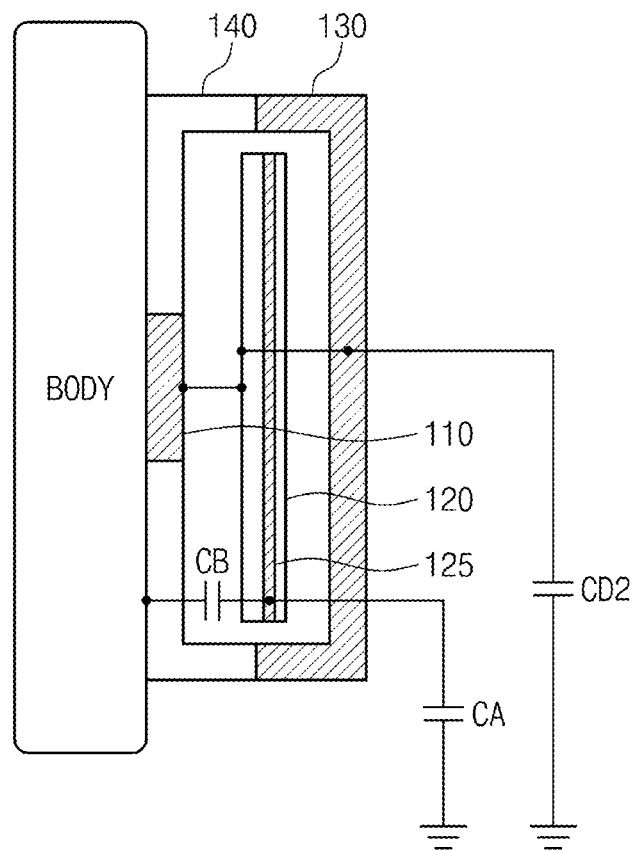
FIG. 7 is a diagram illustrating an exemplary cross-sectional view of a human body communication device of FIG. 6.

FIG. 7 is a diagram illustrating an exemplary cross-sectional view of a human body communication device of FIG. 6. Referring to FIG. 7, the human body communication device 100 includes the first electrode 110, the communication circuit unit 120, the second electrode 130, and the case 140. The first electrode 110, the communication circuit unit 120, the second electrode 130, and the case 140 correspond to the first electrode 110, the communication circuit unit 120, the second electrode 130, and the case 140 of FIG. 3, respectively. The communication circuit unit 120 includes the ground electrode 125. In the receiving mode, the ground electrode 125 is not directly electrically connected to the second electrode 130.

In the receiving mode, a coupling capacitance CD2 is formed between the second electrode 130 and earth ground (the earth). The coupling capacitance CD2 may be greater than the first capacitance CA between the earth ground and the ground electrode 125. As a result, since the coupling of the second electrode 130 to the earth ground is stronger than that of the ground electrode 125, the second electrode 130 may have a more stable voltage level than the ground electrode 125.

As a specific electrode is further away from the human body BODY, the noise induced from the human body BODY to the specific electrode is decreased. Since the second electrode 130 is farther from the human body BODY than the ground electrode 125, the noise induced to the second electrode 130 may be less than the noise induced to the ground electrode 125. Therefore, rather than when the differential amplifier AMP of FIG. 6 amplifies the signal received from the first electrode 110 with respect to the ground electrode 125, the amplification of noise may be decreased when the differential amplifier AMP of FIG. 6 amplifies the signal received from the first electrode 110 with respect to the second electrode 130. That is, since the signal received from the human body BODY is amplified based on the second electrode 130, a stable amplification operation is possible.

Figure 8:
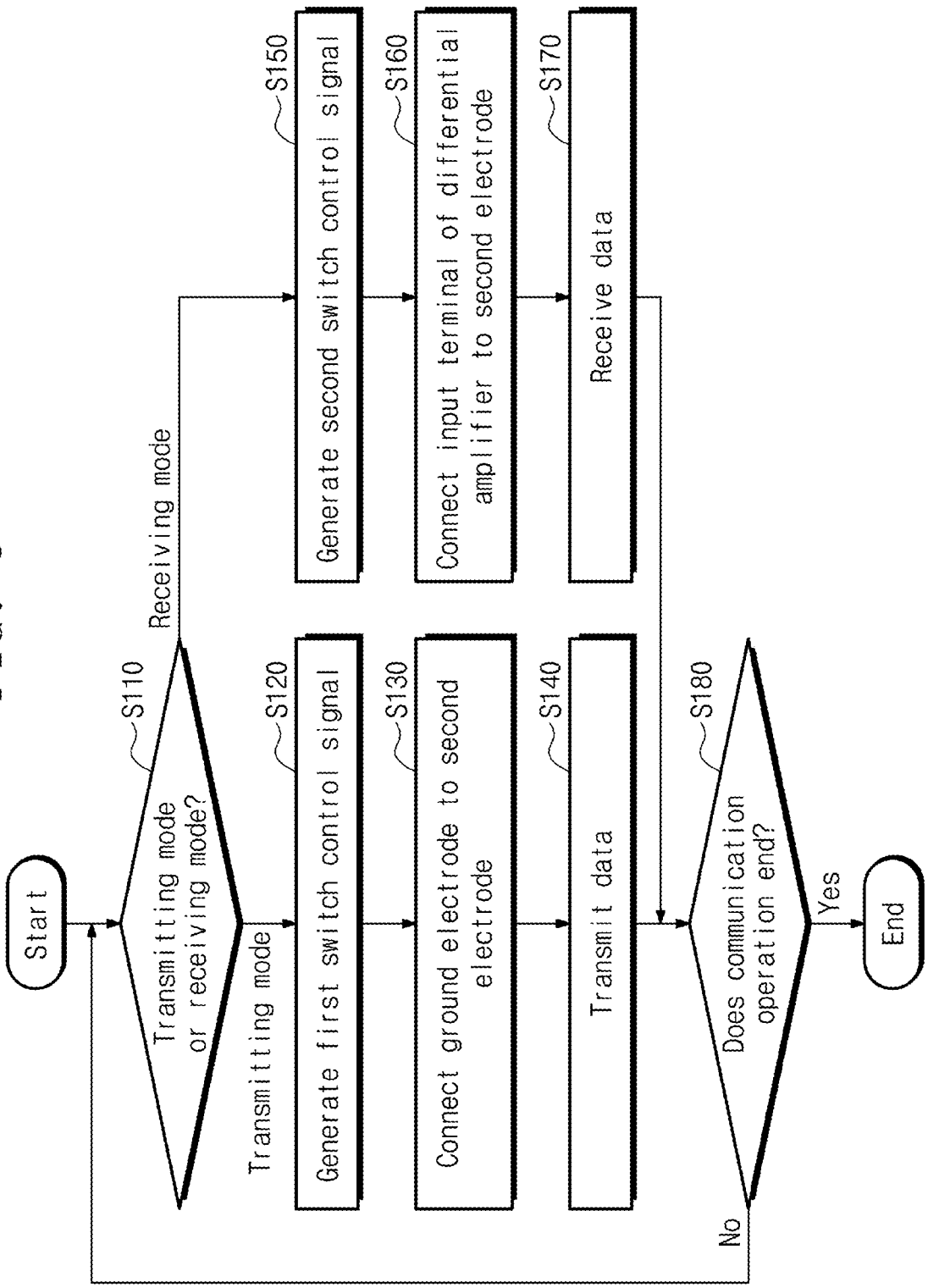
FIG. 8 is an exemplary flowchart describing a method of operating a human body communication device of FIG. 2.

FIG. 8 is an exemplary flowchart describing a method of operating a human body communication device of FIG. 2. Operations of FIG. 8 may be performed in the human body communication device 100 described with reference to FIGS. 1 to 7. For convenience of description, FIG. 8 will be described with reference to the reference numerals of FIG. 2.

In operation S110, the human body communication device 100 determines whether to operate in the transmitting mode or the receiving mode. The transmitting mode is an operation mode in which the transmitting circuit 121 generates the data to be transmitted and outputs the data to the first electrode 110. The receiving mode is an operation mode in which the receiving circuit 123 receives the data and processes the received data.

When the operation mode is determined as the transmission mode, operation S120 to operation S140 proceed. In operation S120, the controller 127 may generate the first switch control signal. In operation S130, the switch 126 may electrically connect the ground electrode 125 and the second electrode 130 to each other in response to the first switch control signal. In this case, the second electrode 130 may not be connected to the differential amplifier AMP of the receiving circuit 123 through the switch 126. In operation S140, the transmitting circuit 121 generates data, based on the reference ground by the second electrode 130. Such data correspond to the first signal DT of FIG. 2. The reference ground may be closer to the voltage level of the earth ground by the second electrode 130, and the amplitude range of the first signal DT may increase.

When the operation mode is determined as the receiving mode, operation S150 to operation S170 proceed. In operation S150, the controller 127 may generate the second switch control signal. In operation S160, the switch 126 may electrically connect the input terminal (the second input terminal) of the differential amplifier AMP and the second electrode 130 in response to the second switch control signal. In this case, the second electrode 130 may not be connected to the ground electrode 125 through the switch 126. In operation S170, the receiving circuit 123 receives data through the first electrode 110. Such data correspond to the second signal DR of FIG. 2. Since the second signal DR is provided to the first input terminal of the differential amplifier AMP and amplified based on the second electrode 130, the stable amplification operation may be performed and the signal-to-noise ratio may be improved.

In operation S180, the human body communication device 100 determines whether the transmitting operation or the receiving operation is ended. When the communication is continuously performed, operations S110 to S170 are repeated.

A human body communication device and its operating method according to an embodiment of the inventive concept may improve the coupling capacitance between the ground electrode and the earth, and increase the amplitude of the transmitting signal, by connecting a separate electrode that is spaced apart from a communication electrode to the ground electrode in the transmitting mode.

A human body communication device and its operating method according to an embodiment of the inventive concept may decrease the amplification of noise and improve the signal-to-noise ratio performance, by connecting a separate electrode to one terminal of a differential amplifier in the receiving mode.

A human body communication device and its operating method according to an embodiment of the inventive concept may increase the transmitting performance and the receiving performance according to the transmitting mode and the receiving mode, using a switch.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. A human body communication device comprising:
a first electrode configured to transmit a first signal to a human body in a transmitting mode and receive a second signal from the human body in a receiving mode;
a second electrode spaced apart from the first electrode;
a transmitting circuit configured to generate the first signal in the transmitting mode and transmit the first signal to the first electrode;
a receiving circuit configured to receive the second signal from the first electrode in the receiving mode and include a differential amplifier for amplifying a difference between a voltage level of a first input terminal depending on the second signal and a voltage level of a second input terminal;
a ground electrode electrically connected to the transmitting circuit and the receiving circuit; and
a switch configured to electrically connect the second electrode and the ground electrode in the transmitting mode and electrically connect the second electrode and the second input terminal in the receiving mode,
wherein the second electrode is electrically disconnected from the transmitting circuit in both of the transmitting mode and the receiving mode.

2. The human body communication device of claim 1, wherein the switch disconnects the second electrode and the second input terminal in the transmitting mode and disconnects the second electrode and the ground electrode in the receiving mode.

3. The human body communication device of claim 1, further comprising a controller configured to determine the transmitting mode and the receiving mode, control the transmitting circuit to transmit the first signal in the transmitting mode, and control the receiving circuit to receive the second signal in the receiving mode.

4. The human body communication device of claim 1, further comprising a controller configured to generate a first switch control signal in the transmitting mode and a second switch control signal in the receiving mode,
wherein the switch electrically connects the second electrode and the ground electrode, based on the first switch control signal, and electrically connects the second electrode and the second input terminal, based on the second switch control signal.

5. The human body communication device of claim 1, wherein, in the transmitting mode, a voltage level of the ground electrode is equal to a voltage level of the second electrode.

6. The human body communication device of claim 1, wherein, in the receiving mode, a voltage level of the second electrode is different from a voltage level of the ground electrode, and is equal to the voltage level of the second input terminal.

7. The human body communication device of claim 1, wherein the receiving circuit further comprises a filter configured to filter the second signal, and
wherein the differential amplifier receives the filtered second signal through the first input terminal.

8. The human body communication device of claim 1, wherein the first electrode and the second electrode face each other with respect to the ground electrode.

9. The human body communication device of claim 1, wherein a distance between the first electrode and the second electrode is greater than a distance between the first electrode and the ground electrode.

10. The human body communication device of claim 1, wherein the first electrode is configured to be in contact with a living body, and the second electrode is configured to be spaced apart from the living body.

11. A human body communication device comprising:
a first electrode;
a second electrode facing the first electrode; and
a communication circuit unit between the first electrode and the second electrode,
wherein the communication circuit unit comprising:
a transmitting circuit configured to transmit a first signal to the first electrode in a transmitting mode;
a receiving circuit configured to receive a second signal from the first electrode in a receiving mode, including a differential amplifier for amplifying a difference between a voltage level of the second signal and a voltage level of the second electrode; and a ground electrode electrically connected to the transmitting circuit and the receiving circuit, the ground electrode configured to provide a reference ground to the transmitting circuit and the receiving circuit, and to be electrically connected to the second electrode when the transmitting circuit transmits the first signal, wherein the second electrode is electrically disconnected from the transmitting circuit in both of the transmitting mode and the receiving mode.

12. The human body communication device of claim 11, further comprising a case provided with an upper hole to which the second electrode is coupled and a lower hole to which the first electrode is coupled, the case accommodating the communication circuit unit.

13. The human body communication device of claim 11, wherein an area of the second electrode is wider than an area of the first electrode.

14. The human body communication device of claim 11, wherein a distance between the first electrode and the second electrode is greater than a distance between the first electrode and the ground electrode.

15. The human body communication device of claim 11, wherein the communication circuit unit further comprises a switch configured to electrically connect the second electrode and the ground electrode when the transmitting circuit transmits the first signal, and electrically connect the second electrode and the differential amplifier when the receiving circuit receives the second signal.

16. The human body communication device of claim 15, wherein the second signal is provided to a first input terminal of the differential amplifier, and wherein, when the receiving circuit receives the second signal, the switch electrically connects the second electrode and a second input terminal of the differential amplifier.

17. The human body communication device of claim 15, wherein the communication circuit unit further comprises a controller configured to generate a first switch control signal when the transmitting circuit transmits the first signal, and generate a second switch control signal when the receiving circuit receives the second signal, and wherein the switch electrically connects the second electrode and the ground electrode, based on the first switch control signal, and electrically connects the second electrode and the differential amplifier, based on the second switch control signal.

18. A method of operating a human body communication device, the method comprising:

determining a transmitting mode for transmitting a first signal to a human body to through a first electrode or a receiving mode for receiving a second signal from the human body through the first electrode;

electrically connecting a second electrode to only a ground electrode during the transmitting mode, the second electrode facing the first electrode, the first electrode being closer to the human body than the second electrode;

transmitting the first signal to the first electrode in the transmitting mode;

receiving the second signal at a first input terminal of a differential amplifier through the first electrode in the receiving mode; and electrically connecting the second electrode to a second input terminal of the differential amplifier in the receiving mode.

19. The method of claim 18, further comprising:

generating a switch control signal when the transmitting mode is determined, wherein the electrically connecting of the second electrode to the ground electrode in the transmitting mode includes:

disconnecting the second input terminal and the second electrode, based on the switch control signal; and connecting the second electrode and the ground electrode, based on the switch control signal.

20. The method of claim 18, further comprising:

generating a switch control signal when the receiving mode is determined, wherein the electrically connecting of the second electrode to the second input terminal of the differential amplifier in the receiving mode includes:

disconnecting the second electrode and the ground electrode, based on the switch control signal; and connecting the second input terminal and the second electrode, based on the switch control signal.

* * * * *